United States Patent
Berlin et al.

(10) Patent No.: US 10,576,663 B2
(45) Date of Patent: Mar. 3, 2020

(54) PROCESS AND DEVICE FOR THE PRODUCTION OF A FIBRE-COMPOSITE MATERIAL

(71) Applicant: Evonik Degussa GmbH, Essen (DE)

(72) Inventors: Mark Reinhard Berlin, Recklinghausen (DE); Udo Sondermann, Dorsten (DE)

(73) Assignee: Evonik Degussa GmbH, Essen (DE)

( * ) Notice: Subject to any disclaimer, the term of this patent is extended or adjusted under 35 U.S.C. 154(b) by 196 days.

(21) Appl. No.: 15/540,861

(22) PCT Filed: Dec. 23, 2015

(86) PCT No.: PCT/EP2015/081171
§ 371 (c)(1),
(2) Date: Jun. 29, 2017

(87) PCT Pub. No.: WO2016/107808
PCT Pub. Date: Jul. 7, 2016

(65) Prior Publication Data
US 2018/0001516 A1    Jan. 4, 2018

(30) Foreign Application Priority Data
Dec. 29, 2014   (EP) .................................. 14200411

(51) Int. Cl.
*B29B 15/12* (2006.01)
*B29C 70/52* (2006.01)
*B29K 105/06* (2006.01)

(52) U.S. Cl.
CPC .......... *B29B 15/122* (2013.01); *B29C 70/521* (2013.01); *B29K 2105/06* (2013.01)

(58) Field of Classification Search
CPC .................................................. B29C 70/521
See application file for complete search history.

(56) References Cited

U.S. PATENT DOCUMENTS

| | | | |
|---|---|---|---|
| 4,883,625 | A | 11/1989 | Glemet et al. |
| 5,002,712 | A | 3/1991 | Goldmann et al. |

(Continued)

FOREIGN PATENT DOCUMENTS

| | | |
|---|---|---|
| CN | 101474868 A | 7/2009 |
| DE | 41 12 129 A1 | 10/1992 |

(Continued)

OTHER PUBLICATIONS

WO2014/140025, machine translation, Sep. 2014. (Year: 2014).*
WO 2014/140025, machine translation (Year: 2014).*

*Primary Examiner* — Robert A Vetere
(74) *Attorney, Agent, or Firm* — Oblon, McClelland, Maier & Neustadt, L.L.P.

(57) ABSTRACT

Very good impregnation quality is achieved by a process for production of a fiber-composite material, with introducing a fiber layer by a spreader device and thus spreading to a width greater than that of the final product, at least by a factor of 1.2, where the extent of spreading of the fiber layer is such that its average thickness is 1 to 50 times the filament diameter; applying a melt by at least one applicator nozzle to the spread material; by virtue of cross-section-narrowing, the mould brings the width of the wetted fiber layer at least to the cross section with which the product leaves the take-off die; a radius then deflects the wetted fibers by an angle of 5 to 60°; a relaxation zone renders the fiber distribution more uniform to give a uniform height; achieving the first shaping by a take-off die at the end of the mould.

11 Claims, 3 Drawing Sheets

(56) References Cited

U.S. PATENT DOCUMENTS

| | | | | |
|---|---|---|---|---|
| 5,302,419 A | * | 4/1994 | Muzzy | B29C 70/20 |
| | | | | 427/185 |
| 6,270,851 B1 | * | 8/2001 | Lee | B29C 70/50 |
| | | | | 427/434.7 |
| 2002/0006987 A1 | * | 1/2002 | Nakayama | C08L 101/00 |
| | | | | 524/27 |
| 2013/0147082 A1 | * | 6/2013 | Johnson | B29C 41/30 |
| | | | | 264/136 |

FOREIGN PATENT DOCUMENTS

| | | | | |
|---|---|---|---|---|
| EP | 0 056 703 A1 | 7/1982 | | |
| EP | 0 364 829 A2 | 4/1990 | | |
| JP | 2006/289714 A | 10/2006 | | |
| JP | 2007/076224 A | 3/2007 | | |
| WO | WO 2012/149129 A1 | 11/2012 | | |
| WO | WO 2014/140025 A1 | 9/2014 | | |
| WO | WO-2014140025 A1 | * 9/2014 | ........... | B29C 70/523 |
| WO | WO 2016/066512 A1 | 5/2016 | | |

* cited by examiner

PROCESS AND DEVICE FOR THE PRODUCTION OF A FIBRE-COMPOSITE MATERIAL

The invention relates to a process for the production of composite materials, and also to a device which can impregnate one or more fibre bundles with a melt. The specific design permits processing of various fibre materials and fibre types, even those with relatively high tex value (e.g. heavy tows). The particular feature is achievement of robust individual-fibre impregnation over a very wide viscosity range. Unlike in the prior-art solutions in common use, it is also possible to process relatively high-viscosity systems.

The spreading of a fibre bundle during melt impregnation is known: EP 0 056 703 A1 describes a process in which reinforcement-fibre rovings are drawn through a thermoplastic melt into which at least one heated surface in the form of a heated spreader bar has been immersed in order to spread the rovings. However, in practice there is always a need for a plurality of spreader devices. The take-off forces that have to be applied increase greatly with the number of spreader devices, with the viscosity of the melt and with the take-off velocity. Since the resultant high take-off forces, and also the mechanical friction on the bars, damage the reinforcement fibre and thus impair the properties of the composite material, this method has very restricted use. An additional factor is that the quality of impregnation, and with this also the quality of the products, decrease with increasing melt viscosity and increasing take-off velocity. The process of EP 0 056 703 A1 therefore gives good results only with melt viscosities up to 30 Pas and with low take-off velocities (below 0.3 m/min).

EP 0 364 829 A2 describes impregnation of reinforcement fibres in a pressure chamber at from 1 to 800 bar. According to the statements in that publication no spreading of the fibre bundle is required here.

Low matrix viscosity can give more effective impregnation. The higher the viscosity, the less effective the impregnation. Methods of mitigating this effect result in solutions with very low process velocities in order to increase residence time, or use very many deflection points, resulting in a high degree of fibre damage and likewise slowing the process. The geometry of the mould can form these deflection points, as described by way of example in U.S. Pat. No. 4,883,625, or there can be deflection bars introduced (e.g. JP 2007076224A). In order to reduce the resultant fibre damage, it is also possible to use very precise matrix application, followed by a large number of subsequent deflection points with very small deflection angles (DE 41 12 129 A1; WO 2012/149129). Other methods are simple matrix application and subsequent impregnation by means of calender rolls in any desired arrangement (e.g. CN101474868A). The restriction here applies when compositions are used that are heat-sensitive and/or susceptible to thermo-oxidative degradation, and also applies to the resultant web velocities. Other technical solutions require a large excess of matrix in impregnation chambers or in impregnation baths, greatly increasing the residence time of the polymer used. Here again it is not possible to process polymers susceptible to degradation.

The Japanese patent application JP 2006289714A describes an impregnation process in which the fibres are spread for the impregnation procedure. The emphasis here is on vibration-assisted impregnation. In one embodiment the prespreading is achieved by means of vibrating deflector rollers in a melt-filled chamber. The long residence time of the melt is disadvantageous, as also is the risk of fibre damage caused by the vibration. The latter, alongside a plurality of deflection points, prevents achievement of high process velocities.

WO 2014140025 A1 describes a device for the pultrusion of fibre-reinforced thermoplastic semifinished products where, prior to wetting with matrix polymer, the fibre bundles are subjected to tension and expanded. The tension increase and expansion is achieved via a plurality of deflectors in the mould. The device is divided into two chambers controlled to different temperatures, one for preimpregnation and one for shaping. This device leads to major problems when relatively fine structures are produced, for example thin and highly fibre-reinforced films. The many deflectors in the mould increase filament tension so greatly that the fibres have a tendency to break. Addition of matrix polymer increases this resistance. Accordingly, again this technology can only be used in the field of semifinished products with relatively high wall thicknesses and restricted fibre proportion by volume.

WO 2012149129 A1 describes an impregnation process for the continuous impregnation of rovings. The impregnation principle consists in uniform film application and slow massaging of the melt into the prespread rovings. In order to ensure impregnation, the fibre-melt mixture is drawn across a very large number of small profiles in the form of waves or of similar shape. Brief contact with small deflection angles permits careful penetration of the melt into the fibres, and also homogeneous distribution. The major disadvantage of this impregnation technique is that the residence time of the melt in the impregnation chamber is sometimes very high. After a short time the cavities resulting from the geometry become blocked, and heat-sensitive compositions undergo degradation or aggregation. The impregnation effect is moreover achieved via heated and rotating rolls attached in the impregnation chamber and amenable to setting with a specific velocity. It is thus possible to provide a specific fibre tension to the spread fibres in this region. The rear roll pair moreover provides additional impregnation under pressure via the nip that has been set. Because this roll pair has been placed in the impregnation mould and is surrounded for long periods by liquid melt, here again contaminants rapidly accumulate, taking the form of filament residues and polymer, which degrades. It is difficult to achieve continuous processing of heat-sensitive compositions by this method.

In contrast to this, the object of the present invention consists in solving the abovementioned problems and in particular providing a process involving a simple method for achieving a high degree of impregnation with low residence time of the melt, where fibre damage can be avoided and nevertheless a high take-off velocity can be achieved. The device used for the process should comprise no dead zones and be self-cleaning, in order to allow shorter polymer residence times. The process should lead to very good impregnation quality in particular for a large range of fibre types, and also for relatively high matrix viscosities. The expression very good impregnation quality means that very finely distributed individual filament fibres are present, and ideally matrix completely surrounds each individual one of these, and there are almost no non-impregnated filament bundles or filament domains present. There are moreover also almost no air inclusions present in the product. Impregnation quality is assessed in the usual way by using microsections or scanning electron micrographs.

This object is achieved via a process for the production of a composite material which realises a specific combination of wetting method and further impregnation. The process comprises the following steps:

a) a fibre layer is introduced by way of a spreader device and thus spread to a width greater than that of the final product, at least by a factor of 1.2, preferably by a factor of 1.4 and particularly preferably by a factor of 1.6, where the extent of spreading of the fibre layer is such that its average thickness corresponds to 1 to 50 times the filament diameter;
b) a melt is applied by means of at least one applicator nozzle to the spread material;
c) by virtue of cross-section-narrowing, the mould brings the width of the wetted fibre layer at least to the cross section with which the product leaves the take-off die;
d) a radius then deflects the wetted fibre layer by an angle of 5 to 60°, preferably 8 to 50°, particularly preferably 12 to 40° and with particular preference 15 to 35°;
e) a relaxation zone renders the fibre distribution more uniform to give a uniform height;
f) the first shaping is achieved by a take-off die at the end of the mould.

The product can then be calendered and cooled.

In this process the fibre layer is drawn through a transport duct which extends from the intake as far as the take-off die.

A preferred embodiment is characterized in that in the step c) the width of the wetted fibre layer is reduced to a cross section that is smaller than the cross section with which the product leaves the take-off die, and additionally, either prior to or after the step d), the width of the wetted fibre layer is brought to the cross section with which the product leaves the take-off die. In the step c) the width of the wetted fibre layer is generally reduced to a cross section which is 99 to 10% of the cross section with which the product leaves the take-off die. Particularly preferred values are 98 to 16%, values to which particular preference is given are 96 to 24%, and very particularly preferred values are 96 to 24%. The following variants are in particular possible here:

1. In the step c) the width of the wetted fibre layer is reduced to a cross section that is smaller than the cross section with which the product leaves the take-off die, and then the width of the wetted fibre layer is directly brought to the cross section with which the product leaves the take-off die. The steps d), e) and f) then follow sequentially.
2. In the step c) the width of the wetted fibre layer is reduced to a cross section that is smaller than the cross section with which the product leaves the take-off die. The step d) then takes place directly. The width of the wetted fibre layer is then brought to the cross section with which the product leaves the take-off die. The steps e) and f) then follow.
3. In the step c) the width of the wetted fibre layer is reduced to a cross section that is smaller than the cross section with which the product leaves the take-off die. The steps d) and e) then follow directly. The width of the wetted fibre layer is then brought to the cross section with which the product leaves the take-off die, whereupon the step f) follows.

The expression "fibre layer" means a bundle made of a relatively large number of individual filaments. Several thousand individual filaments are usually involved here. The fibre layer can be composed of a roving or else of a plurality of rovings; it is preferably composed of one to at most 1000 rovings, and particularly preferably of one to at most 800 rovings. In the process of the invention these rovings are unwound or withdrawn individually from bobbins and, prior to the spreader device or at the ingoing end of the spreader device, brought together in such a way that they provide a single fibre layer. The expression "roving" here means in general terms a bundle of individual filaments; this bundle can be composed of a single fibre type or else of various fibre types. In principle all fibres of adequate length are suitable; it is possible to use inorganic fibres, polymer fibres, and also natural fibres. Examples of suitable fibres are metal fibres, glass fibres (e.g. made of E glass, A glass, C glass, D glass, AR glass, R glass, S1 glass, S2 glass, etc.), carbon fibres, metallized carbon fibres, boron fibres, ceramic fibres (e.g. made of $Al_2O_3$ or $SiO_2$), basalt fibres, silicon carbide fibres, aramid fibres, polyamide fibres, polyethylene fibres, polyester fibres (e.g. made of polybutyleneterephthalate), fibres made of liquid-crystalline polyester, polyacrylonitrile fibres, and also fibres made of polyimide, polyetherimide, polyphenylenesulphide, polyetherketone, polyetheretherketone, and also cellulose fibres, these having been spun by means of the viscose process and usually being termed viscose fibres, hemp fibres, flax fibres, jute fibres and the like. The cross section of the fibres can by way of example be circular, rectangular, oval, elliptical, or of irregular rounded shape. With fibres of cross section deviating from the circular shape (for example flat glass fibres) it is possible to achieve a higher fill level of fibre in the finished part, and thus higher strength.

The spreading in step a) is dependent on the geometry of the final product. If the final product is a tape, the spreading factor for the fibre layer is comparatively high. If, in contrast, the final product is relatively thick, for example having a rectangular or square cross section, the spreading factor for the fibre layer, based on the width of the final product, can be relatively low, and it is therefore not possible to state any useful generally applicable upper limit. Spreading that takes place is dependent on the geometry of the final product, the spreading factor preferably being at most 30, particularly preferably at most 20, with particular preference at most 14 and very particularly preferably at most 8, based in each case on the width of the final product.

The extent of spreading of the fibre layer here is such that its average thickness corresponds to 1 to 50 times the filament diameter, preferably 1 to 40 times the filament diameter, particularly preferably 1.5 to 35 times the filament diameter and very particularly preferably 1.8 to 30 times the filament diameter. The averaging here takes place across the entire width of the fibre layer. In the case of fibres with non-circular cross section, the shortest cross-sectional axis is selected as filament diameter. In respect of the fibre cross section, the information provided by the fibre manufacturer can be used. In the case of a mixture of various fibres, the arithmetic average based on the number of the individual filaments is selected as filament diameter. When manufacturers' information is not available, or in the case of fibres of identical type with different geometry, for example natural fibres, the average filament diameter is determined via a scanning electron micrograph (SEM), and measurement and calculation of the arithmetic average based on the number of the individual filaments.

The matrix of the composite material can be a thermoplastic moulding composition, a thermoset, a thermoplastic-thermoset hybrid system, a thermoplastic elastomer or a crosslinked elastomer. Thermoplastic moulding compositions are composed of a thermoplastic as main constituent or sole constituent. Other constituents can by way of example be stabilizers, processing aids, pigments, flame retardants, other thermoplastics as blend components, impact modifiers or the like. Suitable thermoplastics are by way of example polyolefins (for example polyethylene or polypropylene), polyesters (for example polyethyleneterephthalate, polybutyleneterephthalate, polyarylates or liquid-crystalline polyesters), polycarbonate, polyestercarbonate, polyamides (for example PA46, PA6, PA66, PA610, PA612, PA1010, PA11, PA12), semiaromatic polyamides (PPA) and transparent polyamides (for example based on linear or branched aliphatic, cycloaliphatic or aromatic dicarboxylic acids and diamines), polyarylene ether ketones (for example polyetheretherketone, polyetherketone or polyetheretherketoneketone), polyphenylenesulphide, polyetherimide, polymethylmethacrylate, polystyrene, styrene-acrylonitrile copolymers (SAN), styrene-acrylonitrile-butadiene copolymers (ABS), polyacetal, polyurethane, polyimide, polysulphone, polyether sulphone, polyphenylene oxide and fluoropolymers (for example PVDF and ETFE).

Suitable thermosets are by way of example unsaturated polyester resins, epoxy resins, amino plastics, phenolic plastics, crosslinked polyacrylates, polyurethanes, melamine resins, vinyl ester resins and bismaleimide resins. The melt applied in the step b) is in this case a resin-hardener mixture or any other suitable precursor, for example a prepolymer.

Suitable thermoplastic elastomers are by way of example TPE O (thermoplastic elastomers based on olefin, for example PP/EPDM), TPE V (crosslinked thermoplastic elastomers based on olefin, in particular PP/crosslinked EPDM), TPE U (thermoplastic elastomers based on polyurethane), TPE E (thermoplastic polyester elastomers), TPE S (styrene block copolymers, for example SBS, SEBS, SEPS, SEEPS and MBS), and also TPE A (polyamide elastomers).

Suitable crosslinked elastomers are obtained from a compounded rubber material which, as in the prior art, comprises a vulcanizing agent, and also optionally comprises vulcanization auxiliaries, fillers, oils, and also other conventional additions. Examples of elastomers of this type are EPDM, styrene/butadiene rubber, butyl rubber, silicone rubber, epoxy rubber, chloroprene rubber, acrylic rubber and the like.

The cross-section narrowing in the step c) leads to reduction of the spreading of the wetted fibre layer; this means that the width thereof is changed in the direction of the width of the take-off die. In one embodiment the width of the wetted fibre layer is brought to the width of the take-off die. In another, preferred embodiment the width of the wetted fibre layer is brought to a width that is smaller than the width of the take-off die. In this case the width of the wetted fibre layer is in turn increased by renewed spreading on the route to the take-off die. The manner in which the cross-section narrowing in the step c) is carried out is preferably such that in the case of all of the embodiments considered here the width of the wetted fibre layer is reduced at least by a factor of 1.2, and particularly preferably at least by a factor of 1.4.

In the subsequent step d) the deflection radius is preferably 2 to 90 mm, particularly preferably 3 to 60 mm, with particular preference 4 to 40 mm and very preferably 4 to 30 mm. Variations of the geometry are possible; by way of example the radius at the deflection point can be combined with brief elevation, for example in order to provide break-up of size on the fibre. There is preferably a single deflection point present, so that a single change of direction takes place. This avoids unnecessarily high fibre tension, thus efficiently suppressing fibre breakage.

The take-off die does not generally comprise any integrated take-off equipment. Instead, tension is usually applied to the strand by a take-off directly after the die, or by calender rolls. This type of take-off, for example in the form of rollers or rolls, is prior art, as also are calenders.

Figure 1:
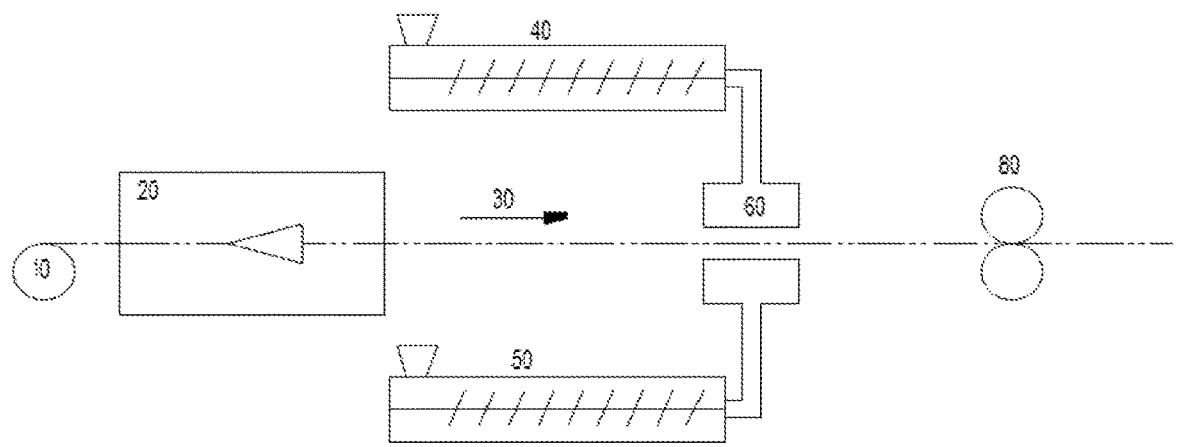
FIG. 1 is a diagram of the system concept.

As depicted in FIG. 1, the fibre layer is unwound, for example in the form of a roving, from a bobbin 10. It is possible here to use a plurality of bobbins 10. The fibre layer is spread on a spreader device 20 and then introduced into the mould. Conventional spreader devices can be used here. The direction of movement of the roving is characterized by 30 in FIG. 1. The fibre layer can optionally be preheated here, for example by means of IR radiation or by circulation of air. Melt is applied to the fibre layer from above and from below through two applicator nozzles 60. It is also possible, as an alternative to this, that the melt is applied only from above or only from below. The melt and the required application pressure are supplied by the extruders 40 and 50. (Melt pumps downstream of a plastifying unit can also be used as an alternative to this.) FIG. 1 does not depict the subsequent cross-section-narrowing system, the deflection radius, the relaxation zone or the take-off die. For final shaping, the profile can also be calendered by means of a calender 80 after take-off. The resultant strand is then either cooled and wound or cut to length; as an alternative to this it can be further processed immediately, e.g. by winding around a core and then cooling (in the case of a thermoplastic matrix) or then hardening (in the case of a thermoset matrix).

Figure 2:
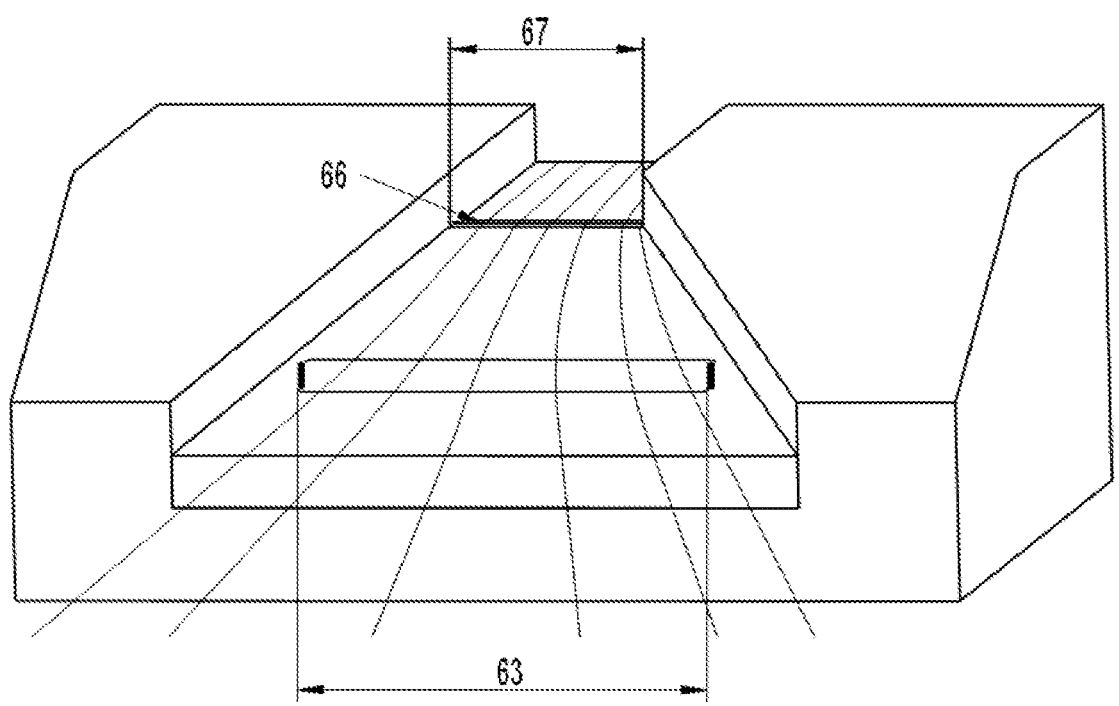
FIG. 2 shows the cross-section-narrowing system which brings the wetted fibre layer to the subsequent cross section of the product.

FIG. 2 shows how the spread fibre layer is introduced into the cross-section-narrowing system. The melt is applied by way of an applicator nozzle 63. In an alternative embodiment the positioning of the application nozzle 63 can also be, instead of as depicted in FIG. 2, at the ingoing end of the cross-section-narrowing system, at a position prior to the cross-section-narrowing, so that the first phase of wetting takes place in the fully spread condition. At the end of the cross-section-narrowing system there is a deflection system 66; the cross section of the fibre layer is reduced at this point to the width 67.

Figure 3:
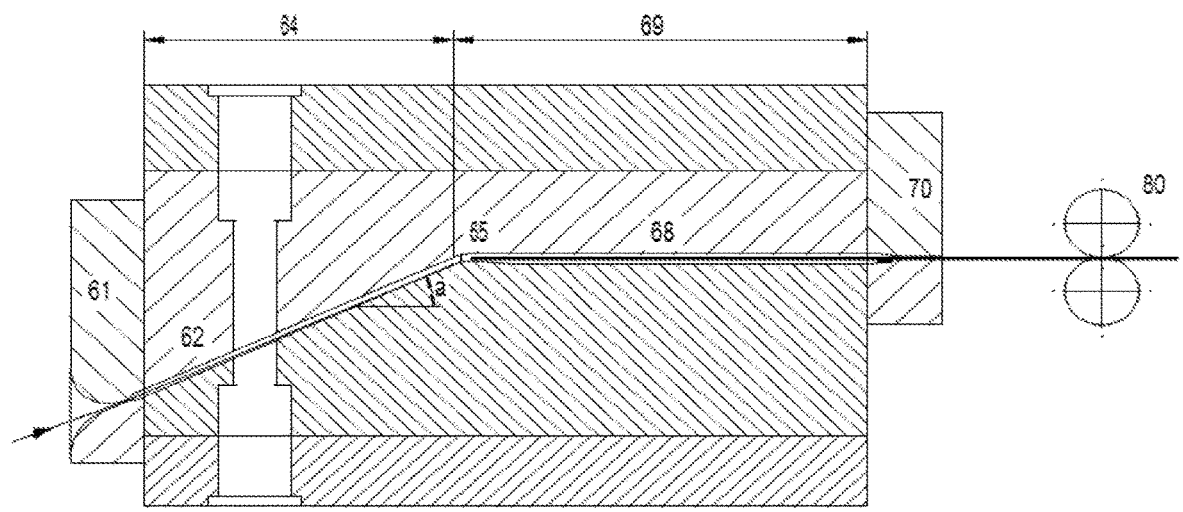
FIG. 3 shows an embodiment of the system.

FIG. 3 views the device from the side. The spread fibre layer is introduced into the mould by way of the intake 61. The melt is applied in the inlet-and-wetting zone 62. The length of the inlet-and-wetting zone is indicated by 64. The matrix is applied by means of application nozzles in the spread condition; because of the relative movements during fibre displacement, the subsequent cross-section-narrowing allows the matrix to penetrate into the layers between fibres. At the end of the cross-section-narrowing system the wetted fibre layer is deflected by the angle $\alpha$ at the deflection system 65. The radius is not depicted here.

This deflection leads to further relative fibre movements, and also to a local pressure gradient from the deflection point into the remaining cavity, permitting further matrix penetration. The arrangement of the deflection system after completion of cross-section-narrowing achieves particularly good impregnation quality in comparison with the embodiments in the prior art where a deflection is implemented during cross-section-narrowing.

The subsequent relaxation zone 68 of length 69 renders the fibre distribution more uniform to give a uniform height. This procedure, and also further impregnation, are assisted by the possibility that this chamber region can have been filled with melt. Attached at the end of the mould is the die 70 that is responsible for the initial shaping of the subsequent product. The pressure here generally increases along the route from the application zone to the die; the precise pressure profile depends on the material. The final shaping here is carried out by the calender 80.

The preferred viscosity of the melt applied in the process of the invention is from 10 mPas to 400 Pas, and particularly up to 300 Pas. In the case of prepolymers or resin-hardener systems which, after curing, give thermosets or thermoplastic-thermoset hybrid systems, viscosity is in the lower range down to 10 mPas or even lower. In the case of a melt made of a thermoplastic moulding composition, a thermoplastic elastomer or a compounded elastomer material viscosity is generally at least 1 Pas. According to the invention, viscosity is the zero-shear viscosity at the temperature of the process, measured in accordance with ASTM D4400 in a mechanical spectrometer.

Operations during application of the melt generally avoid any excess of melt, in particular in the case of relatively high-viscosity melts, or use only a small excess of melt. In the case of operations using an excess of melt, precautions must be taken to ensure that the excess melt can flow out through an aperture provided for this purpose. The ratio of fibres to melt is adjusted in such a way that the proportion by volume of the fibres in the finished part is about 10 to 85%, preferably 15 to 80% and particularly preferably 20 to 75%.

If the matrix of the resultant composite material is a thermoset, the hardening reaction usually takes place mainly in the relaxation zone. The strand drawn off has then in essence already hardened.

The length of the relaxation zone depends by way of example on the melt viscosity, the intended take-off velocity and the size of the system. By way of an example, in the case of a laboratory system producing a tape of width 40 mm made of E glass or S glass and PA12, a length of 100 mm gives very good results. However, this is only an approximate guide. The relaxation zone can also be shorter or else significantly longer.

The take-off velocity can be adjusted as required. It is preferably 0.1 to 30 m/min and particularly preferably 0.5 to 25 m/min.

The strand obtained in the process of the invention can have any desired geometry. It can by way of example be a film, a tape, a sheet, a round profile, a rectangular profile or a complex profile. It is preferably a tape or a sheet; this is in particular true in the case of the process in which, in the step c), the width of the wetted fibre layer is reduced to a cross section that is smaller than the cross section with which the product leaves the take-off die, and additionally after the step d) the width of the wetted fibre layer is brought to the cross section with which the product leaves the take-off die.

In a variant of the process of the invention according to claim 1 or claim 2 the resultant strand comprising a thermoplastic matrix is cut to give elongate long-fibre-reinforced pellets of length 4 to 60 mm, preferably 5 to 50 mm, particularly preferably 6 to 40 mm, with particular preference 5 to 30 mm and very particularly preferably 6 to 25 mm. These pellets can then be used to produce mouldings by means of injection moulding, extrusion, compression moulding or other familiar shaping processes, and particularly good properties of the moulding are achieved here with non-aggressive processing methods. The meaning of non-aggressive in this context is mainly substantial avoidance of disproportionate fibre breakage and the attendant severe fibre length reduction. In the case of injection moulding this means that it is preferable to use screws with large diameter and low compression ratio, and also generously dimensioned channels in the region of nozzle and the gate. A supplementary condition that should be ensured is that the elongate pellets are melted rapidly with the aid of high cylinder temperatures (contact heating), and that the fibres are not excessively comminuted by disproportionate levels of shear. When attention is given to these measures, the mouldings obtained have higher average fibre length than comparable mouldings produced from short-fibre-reinforced moulding compositions. This gives a significant improvement of properties, in particular tensile modulus of elasticity, ultimate tensile strength and notched impact resistance.

The invention also provides a device which is intended for the production of a fibre-composite material and which comprises the following elements:

a) a spreader device by way of which a fibre layer can be introduced and at the same time can be spread to a width greater than that of the final product, at least by a factor or 1.2, preferably at least a factor of 1.4 and particularly preferably at least a factor of 1.6, b) following in the direction of transport, one or more applicator nozzles which can apply melt to the spread fibre layer, c) in the transport duct, a subsequent cross-section-narrowing system which can bring the wetted fibre layer at least to the cross section of the take-off die, d) a subsequent deflection point providing deflection by 5 to 60°, preferably 8 to 50°, particularly preferably 12 to 40° and with particular preference 15 to 35°, e) a relaxation zone and f) a take-off die.

Details of the said device are apparent from the process description above, because the device serves for the conduct of the process of the invention.

As FIG. 2 shows, the construction of the device is preferably such that it has an inlet inclined at an angle determined by the deflection at the deflection point of the element d); the angle of inclination of the inlet corresponds here to the angle of deflection in the element d). Otherwise an inclined arrangement of the take-off die would have been necessary; this would require more difficult engineering of the system.

In a preferred embodiment the design of the cross-section-narrowing system of the element c) is such that the width of the wetted fibre layer can be reduced to a cross section that is smaller than the cross section of the take-off die, and additionally, either prior to or after the deflection point according to element d), the width of the wetted fibre layer can be brought to the cross section of the take-off die.

In the form described, the device comprises a chamber in which a fibre layer is wetted and the cross section is narrowed. However, in particular on the scale required for production it is advantageous for the device to comprise a plurality of chambers, and for the substrands to be brought together at the deflection point or after the deflection point. Preference is therefore given to the following embodiments of the device and of the process:

There are two, three or more chambers mutually superposed; in each chamber a substrand is wetted with melt and the cross section of the transport duct is narrowed. The substrands are then brought together, mutually superposed, at the deflection point or after the deflection point. If the individual substrands comprise different fibres, a specific layer structure can be achieved here in the production of complex profiles.

There are two, three or more chambers mutually superposed; in each chamber a substrand is wetted with melt and the cross section of the transport duct is narrowed.

The substrands are then brought together alongside one another at the deflection point or after the deflection point.

There are two, three or more chambers alongside one another; in each chamber a substrand is wetted with melt and the cross section of the transport duct is narrowed. The substrands are then brought together, mutually superposed, at the deflection point or after the deflection point.

There are two, three or more chambers alongside one another; in each chamber a substrand is wetted with melt and the cross section of the transport duct is narrowed. The substrands are then brought together, alongside one another, at the deflection point or after the deflection point.

The significant difference from previous solutions is, according to the invention, the specific wetting method implemented after a high degree of spreading and the subsequent impregnation of the individual fibres via relative longitudinal and transverse movements which are caused by the cross-section narrowing, the subsequent deflection, and also optional subsequent renewed cross-section widening. Very good impregnation quality is thus achieved across a very wide viscosity range, even when take-off velocity is high.

KEY

10 Bobbin
20 Spreader device
30 Direction of movement of fibre layer
40 Extruder
50 Extruder
60 Applicator nozzle
61 Intake
62 Inlet zone and wetting zone
63 Applicator nozzle
64 Length of inlet zone and wetting zone
65 Deflection system
66 Deflection system
67 Cross-sectional width after deflection
68 Relaxation zone
69 Length of relaxation zone
70 Die
80 Calender

The invention claimed is:

1. A process for producing a fiber-composite material, comprising:
    introducing a fiber layer by a spreader device such that the fiber layer is spread to a width greater than a width of a final product, at least by a factor of 1.2, and that an average thickness of the fiber layer corresponds to 1 to 50 times a diameter of fibers in the fiber layer;
    applying a melt by at least one applicator nozzle to the spread fiber layer, thereby obtaining a wetted fiber layer;
    narrowing a width of the wetted fiber layer to at least a cross section with which the wetted fiber layer leaves a take-off die;
    after the narrowing, deflecting the wetted fiber layer by an angle of 5 to 60°;
    relaxing the wetted fiber layer such that the fibers in the wetted fiber layer are more uniformly distributed and the wetted fiber layer has a uniform height; and
    after the relaxing, first shaping the wetted fiber layer by the take-off die.

2. The process according to claim 1, wherein in the narrowing, the width of the wetted fiber layer is reduced to a cross section that is smaller than the cross section with which the wetted fiber layer leaves the take-off die, and
    the process further comprises, either prior to or after the deflecting, the width of the wetted fiber layer is brought to the cross section with which the wetted fiber layer leaves the take-off die.

3. The process according to claim 2, wherein the applying, the narrowing, the deflecting, the relaxing, and the first shaping are performed in a continuous transport duct which extends from an intake to the take-off die, and the fiber layer is introduced at the intake and the wetted fiber layer leaves the transport duct from the take-off die.

4. The process according to claim 1, wherein a matrix of the composite material is a thermoplastic molding composition, a thermoset, a thermoplastic-thermoset hybrid system, a thermoplastic elastomer or a crosslinked elastomer.

5. The process according to claim 1, wherein in the deflecting, the wetted fiber layer is deflected at a deflection radius of 2 to 90 mm.

6. The process according to claim 1, wherein in the deflecting, the wetted fiber layer is deflected only one time.

7. The process according to claim 1, further comprising:
    after the first shaping, calendaring the wetted fiber layer that has left the strand the take-off die.

8. The process according to claim 1, further comprising:
    after the first shaping, cutting the wetted fiber layer that has left the take-off die to obtain elongate long fiber-reinforced pellets of length 4 to 60 mm.

9. The process according to claim 1, wherein the obtained fiber-composite material is a film, a tape, a sheet, a round profile, a rectangular profile or a complex profile.

10. The process according to claim 1, wherein the width of the introduced fiber layer is maintained prior to the applying of the melt.

11. The process according to claim 1, wherein the applying, the narrowing, the deflecting, the relaxing, and the first shaping are performed in a continuous transport duct which extends from an intake to the take-off die, and the fiber layer is introduced at the intake and the wetted fiber layer leaves the transport duct from the take-off die.

* * * * *